Nov. 19, 1957 R. D. POET 2,813,940
CLEARANCE SIGNALING DEVICE FOR AUTOMOTIVE VEHICLES AND THE LIKE
Filed Feb. 28, 1955
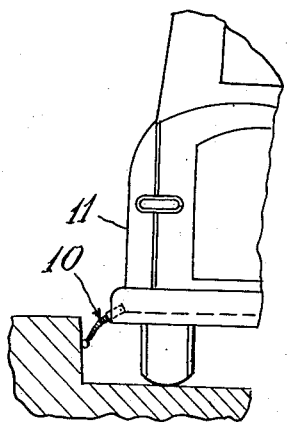
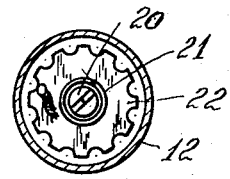
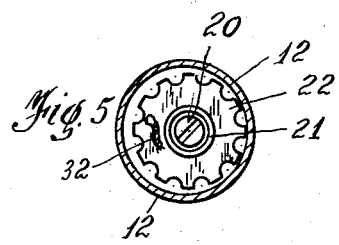
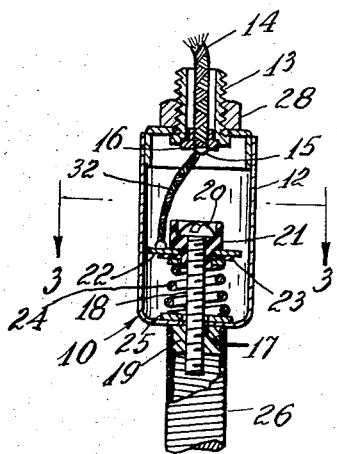
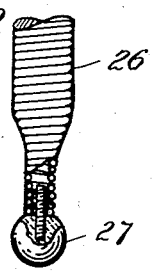
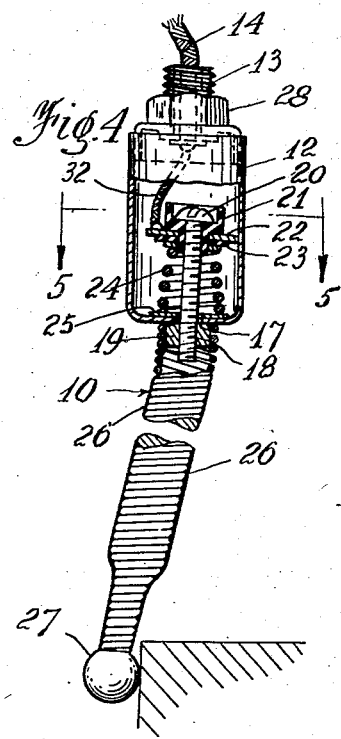
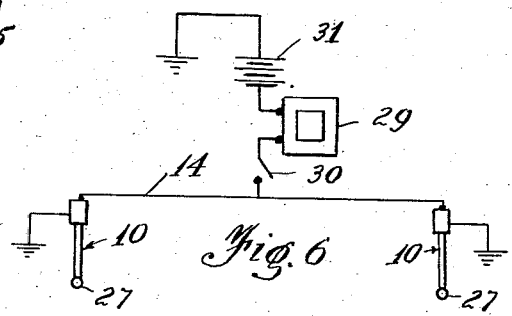
INVENTOR:
Robert D. Poet.
BY Raeph Donath
Attorney.

United States Patent Office 2,813,940
Patented Nov. 19, 1957

2,813,940

CLEARANCE SIGNALING DEVICE FOR AUTOMOTIVE VEHICLES AND THE LIKE

Robert D. Poet, Altoona, Pa.

Application February 28, 1955, Serial No. 490,977

1 Claim. (Cl. 200—61.44)

This invention relates to clearance signaling devices and particularly to a clearance signaling for automotive vehicles and the like.

Many types of clearance signaling devices have been proposed for automotive vehicles to indicate to the operator the approach to vehicles, walls, garage door entrances etc. In general these devices depend upon the vibration and scraping of a spring member to signal such objects. These devices have not been entirely satisfactory because the warning is not sufficiently clear and dependable. Electrical signaling devices have also been proposed but have not been satisfactory because the mud and water thrown against them has made them inoperative.

An object of the present invention is to provide a positive signaling device which is responsive to contact with objects in all directions.

A further object of the invention is to provide an electrical clearance signaling device which is not affected by mud and water and the like.

Another object of this invention is to provide a clearance signaling device which is capable of being distorted to a large degree and yet returns to its original operative position.

Still another object of the invention is to provide a multidirectional electrical clearance signaling device for automotive vehicles which is simple, cheap to manufacture and positive in its operation.

Other objects, advantages and purposes of this invention will be apparent from the following description and the accompanying drawings in which:

Figure 1 is a partial end elevation of an automotive vehicle embodying the signal device of this invention.

Figure 2 is a partial section of a signal device according to this invention in the normal position.

Figure 3 is a section on the line 3—3 of Figure 2.

Figure 4 is a partial section of a signal device according to this invention in the signaling position.

Figure 5 is a section on the line 5—5 of Figure 4.

Figure 6 is a schematic wiring diagram for an installation of the signal device of this invetnion.

Referring to the drawings there is illustrated a multi-directional clearance signaling device 10 according to this invention installed on a vehicle fender or other places indicated by the numeral 11.

The multidirectional clearance signal device 10 is made up of a cylindrical shell 12 of conducting material closed at both ends. One end of the shell 12 is provided with a hollow threaded sleeve of conducting material, indicated by the numeral 13, through which a lead-in wire 14 is carried to a contact 15 mounted in an insulating member 16. The opposite end of the shell 12 is provided with an opening 17 through which a bolt 18 passes and threadingly engages a nut 19 on the outside of the shell 12. The head 20 of the bolt 18 carries an insulator member 21 carrying an annular metal ring 22, preferably serrated about its periphery. An annular ring of insulating material 23 rests on the metal ring 22 and separates it from a spring 24 which rests on the insulating ring 23 and bears against a metal ring 25 in contact with the end of the shell 12 and surrounding bolt 18 so as to maintain the bolt under tension and the nut 19 in tight sealing contact with the exterior of the shell 12 about the opening 17. A feeler spring 26 is fixed on the exterior of nut 19. The feeler spring 26 is preferably made of spring wire wound tightly to form an elongated cylinder tapered at one end and fitted with a plastic ball 27 to prevent scratching or damaging the finish of objects which might be contacted by it.

The multidirectional clearance signal device of this invention operates in the following manner. The threaded sleeve 13 is inserted in an opening in a fender of an automotive vehicle and held in place by a nut 28 which makes electrical contact with the auto body. The lead in wire 14 is connected to a signal device 29, preferably through a switch 30 and into a battery 31. A flexible lead 32 is connected at one end to the contactor 15 within the shell 12 and at its opposite end to the metal ring 22. When the feeler spring 26 contacts an object, it bends and places tension on the nut 19 which causes the bolt 18 to shift in the housing. This in turn causes the metal ring to contact the internal sidewall of housing completing the circuit from the battery through the ring 22 to the housing 12, the sleeve 13 and into the body of the auto.

The resistance to movement of the bolt 18 and ring 22 may be adjusted by the bolt 18. Threading the bolt 18 into nut 19 increases the pressure on spring 24. Loosening the bolt 18 from nut 19 decreases the pressure on spring 24 and thereby reduces the resistance of bolt 18 to movement.

In Figure 6 there is illustrated one form of installation of this invention in which the lead wires of two multi-directional clearance signal devices 10 are connected in parallel through switch 30 to signal device 29 which may be a light, buzzer or similar audio-visual signal.

While a preferred embodiment of this invention has been illustrated and described herein it will be understood that this invention may be otherwise embodied within the scope of the following claim.

I claim:

A multidirectional clearance signal for automotive vehicles and the like comprising a hollow cylindrical shell having apertured end walls closing the shell, a lead in wire passing through one of said apertured walls in sealing engagement therewith, a normally axially extending rigid conductor member passing through the other apertured end member and movable freely therein, a spring acting on the axially extending member tending to urge said member into the shell and to maintain said member in normally axial relation to the shell within the interior thereof, an adjusting nut on the normally axially extending member bearing on the hollow shell and cooperating with the spring to adjustably position the member in the shell and thereby adjustably vary the length of the spring and the pressure exerted by the spring, an annular contactor member on the end of the axially extending member within the shell, said contactor member being insulated from the axially extending member and normally spaced equidistant from the inner walls of the shell, a flexible connector from the lead in wire to the contactor member, flexible feeler means connected to the axially extending member to impart movement thereto upon contacting an object and means connecting the shell in electrical contact with the automotive vehicle.

References Cited in the file of this patent

UNITED STATES PATENTS

| 2,258,334 | Miller | Oct. 7, 1941 |
| 2,507,016 | Hesh | May 9, 1950 |
| 2,508,149 | Eliassen | May 16, 1950 |
| 2,592,742 | Rose | Apr. 15, 1952 |
| 2,740,007 | Amelang | Mar. 27, 1956 |

FOREIGN PATENTS

| 130,262 | Australia | Nov. 25, 1948 |